United States Patent [19]

Parish

[11] Patent Number: 4,622,027

[45] Date of Patent: Nov. 11, 1986

[54] METHOD OF MAKING A CONTAINMENT BAG

[75] Inventor: James M. Parish, Wadsworth, Ohio

[73] Assignee: The B.F. Goodrich Company, Akron, Ohio

[21] Appl. No.: 674,450

[22] Filed: Nov. 23, 1984

[51] Int. Cl.[4] .............................................. F16G 13/02

[52] U.S. Cl. ...................................... 493/226; 383/41; 383/904; 493/189; 493/297; 493/926

[58] Field of Search ........................... 383/36, 41, 904; 493/189, 193, 198, 210, 213, 226, 295–297, 267, 929, 932, 923, 926; 112/441

[56] References Cited

U.S. PATENT DOCUMENTS 2,698,619 1/1955 Beacham et al. ....................... 383/9

3,135,458 6/1964 Steuart ................................. 383/41

3,558,397 1/1971 Clark ................................. 493/210

*Primary Examiner*—Lowell A. Larson

*Assistant Examiner*—Robert Showalter

*Attorney, Agent, or Firm*—Joseph Januszkiewicz

[57] ABSTRACT

A method for making a capture and containment bag having a large reservoir that tapers into an elongated conduit wherein the reservoir is formed by joining two heat sealable panels along their side edges to form a linear end edge and then joining such linear end edge to the flared end of a narrow heat sealable strip with a pair of longitudinally extending side edges of such narrow strip then joined to form a conduit. The two panels are then joined along the remaining side edges as a continuation of the joining of the sides of the narrow strip to form a bag with a large storage reservoir and a narrow elongated discharge control conduit.

5 Claims, 9 Drawing Figures

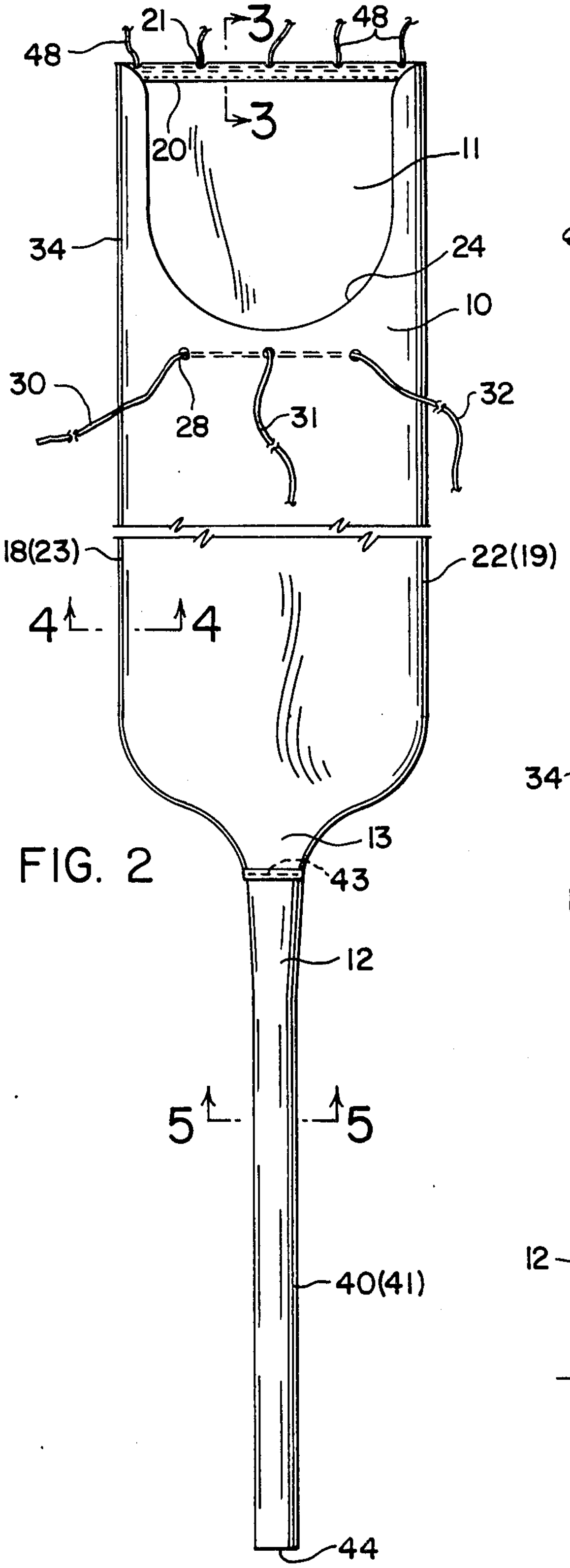
FIG. 2
FIG. 3
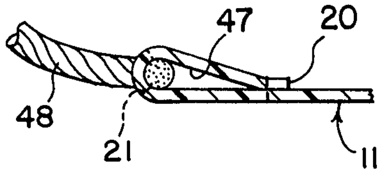
FIG. 4
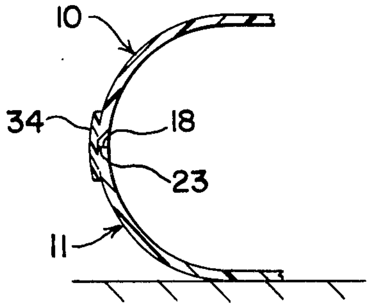
FIG. 5
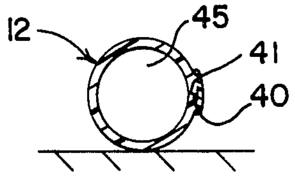

METHOD OF MAKING A CONTAINMENT BAG

BACKGROUND OF THE INVENTION

This invention relates to containment bags and more particularly to a capture and containment bag which is large and yet extremely portable for use as a temporary holding device for hazardous liquids and pollutants wherein the bag may be readily deployed in the event of spillage.

One of the alternatives to containment bags was to provide a holding pond immediate at the site of spillage but it was found desirable to first provide means for such a containment bag to initially store the spillage and if necessary to transfer the contents of the bag to a holding pond removed from the site of the spillage. The fabrication of containment bags has been a problem because of their difficulty in construction to effectively contain spillage without leakage as well as ease of their transport and deployment. The concept of making a bag larger presented practical problems of construction (handling) and leakage from them. As a practical manner there are extremely few commercially available bags for use in the containment of spillage from large containers such as from tank trucks or railroad tank cars.

The present invention is directed to a containment bag that is large, portable and one that can be fabricated in a novel way utilizing an apron which facilitates attachment to the source effecting the spillage. Such containment bag has a large holding reservoir with effective means for transfering the liquid therefrom to either a second containment bag or to a holding pond. The tapered design of the containment bag enhances its holding capacity while greatly reducing the stress concentrations where the holding bag blends into the transfer tube.

SUMMARY OF THE INVENTION

The invention is directed to a containment bag and the method of fabricating such a bag for the storage and transfer of liquids wherein the front and rear heat sealable panels with tapered ends are sealed along one side to provide one linear end edge. A narrow panel with a tapered end is joined at its end with the end edge of the joined panels and thence the narrow panel side edges are heat sealed to form a conduit. The bag is completed by joining the remaining free side edges of the front and rear panels to provide a bag open at one end and at the conduit end.

BRIEF DESCRIPTION OF THE DRAWINGS

FIG. 2 is a plan view of the containment bag with the apron section laid out flat and with draw string attached thereto;

FIG. 3 is a cross-sectional view of the bag taken on line 3—3 of FIG. 2;

FIG. 4 is a cross-sectional view of the bag taken along line 4—4 of FIG. 2;

FIG. 5 is a cross-sectional view of the transfer tube portion of the containment bag taken on line 5—5 of FIG. 2;

DETAILED DESCRIPTION OF THE INVENTION

Figure 6:
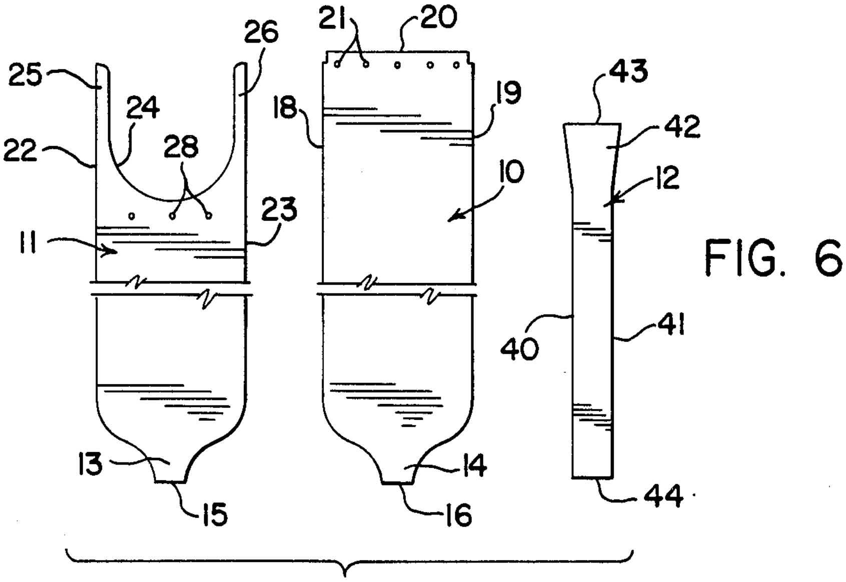
FIG. 6 is a plan view of the different panel sections prior to assembling of the containment bag.

Referring to the drawings wherein like reference numerals designate like or corresponding parts throughout the several views, there is shown in FIGS. 2 and 6 a containment bag made from three panels, namely a pair of upper panels 10 and 11 and a lower elongated panel 12. The upper panels 11 and 10 are elongated and substantially rectangular in shape, tapering at the respective lower ends 13 and 14 and terminating into respective linear edges 15 and 16. The length of such front and back panels as illustrated is over 25 feet (7.62 meters). The one upper panel 10, defining a back panel, has a pair of side edges 18 and 19 and a top edge 20 with a plurality of holes 21 therealong. The other upper panel 11, defining a front panel, has a pair of side edges 22–23 and a recessed portion 24 along the upper edge to provide a pair of strips 25 and 26. Such front panel 11 has a plurality of holes 28 along the periphery of the recessed portion to receive tie strings 30–31–32 as shown in FIG. 2.

Figure 7:
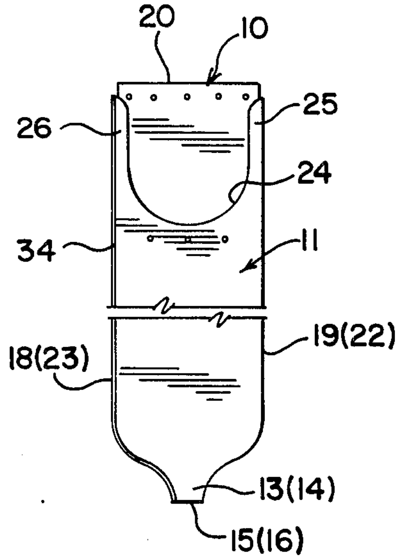
FIG. 7 is a plan view of upper portion of the bag showing two panels heat sealed along one side edges.
Figure 8:
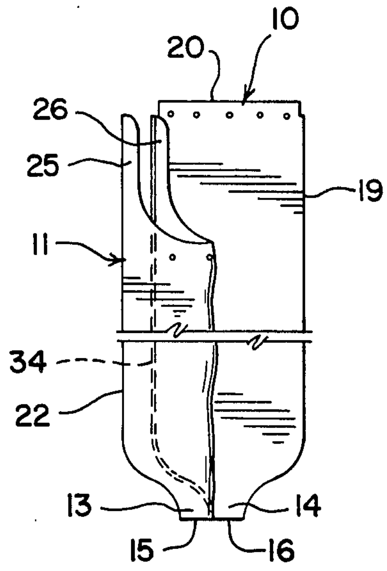
FIG. 8 is a plan view of the two sealed panels with one panel moved aside prior to heat sealing the third panel thereto.

The front panel 11 is connected to the rear panel 12 along their respective edges 18 and 23 as by heat sealing edge 34 designated in FIGS. 4 and 7. With the two panels 10 and 11 joined at their respective edges, the respective terminal linear edges 15 and 16 form a single linear edge as seen in FIG. 8.

Figure 9:
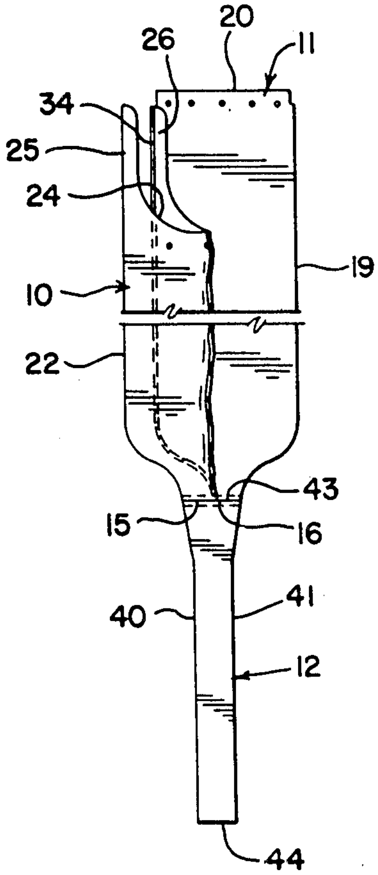
FIG. 9 is a plan view of the two upper panel heat sealed along one side edge and a third panel heat sealed to the two upper panels along the juncture of the transfer tube to the lowermost tapered portion of the upper joined panels.

The lower panel 12 is an elongated flat narrow strip with side edges 40, 41 and a flared upper portion 42 having an upper edge 43 and a lower edge 44. Upper edge 43 is joined by heat sealing such edge 43 to the linear edges 15 and 16 as clearly shown in FIG. 9.

The panel 13 of the containment bag is then folded over with panel 12 being heat sealed along edges 40–41 forming a tubular conduit having a bore 45 (FIG. 5). The bag is completed by continuing the heat sealing between edges 22 and 19 of panels 10 and 11 to complete the formation thereof. The upper edges of the containment bag are turned over and either attached or seamed to provide a passageway 47 to receive ties 48.

Figure 1:
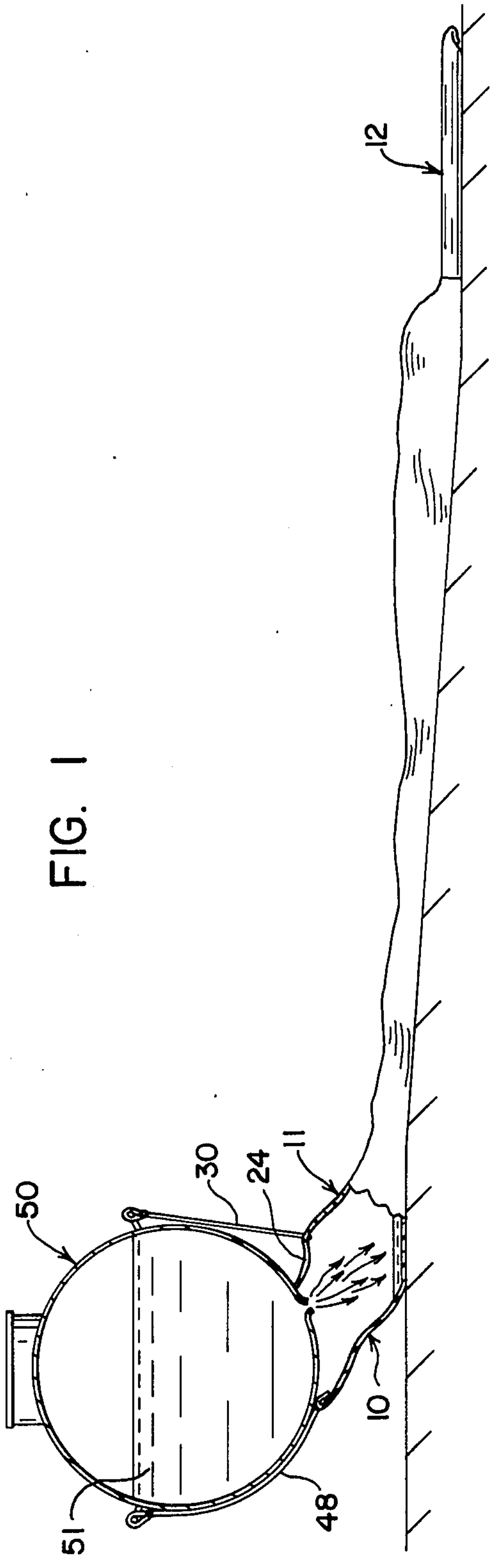
FIG. 1 is a side elevational view of a tank car partly in section showing a containment bag, partly in cross-section, in a deployed condition.

The recessed portion 24 of panel 10 provides an apron as seen in FIG. 2 to facilitate the placement of the containment bag under a leak in a tank car 50 as illustrated in FIG. 1. The ties 48 can be used to support the upper end of the bag such that the liquid 51 from the tank car 50 can be directed into the bag. The ties 30-31–32 from the front panel can be tied to suitable portions or extension of the apparatus being drained to assure capturing and containing the fluid into the bag. The tubular end can be tied off for temporary storage of the fluids or the tubular end can be directed to another containment bag or to a holding pond.

The containment bag is made from a polyethylene material which permits the heat sealing. The bag has a holding capacity of one thousand gallons while on a ten percent slope with an apron, making it easier to deploy and also to control vapors. Such containment bag can be used with similar bags in series, wherein the one bag empties into a second bag. As an example, the polyethylene tube made from panel 12 can be four inches (10.16 centimeters) in diameter, which tube can be tied off near the bag proper, or laid out upstream along the bag to operate as a valve and prevent the loss of liquid. The heat sealing of the containment bag produced a seam stronger than the base fabric and the tapered end of the bag blending into or tapering into the transfer tube portion formed by panel 12 thereby greatly reducing the stress concentrations and eliminates leakage. The fabrication of the bag as above described provides a simplified process for producing an economical bag with superior performance both in withstanding stress concentrations and leaks.

Various modifications are contemplated and may obviously be resorted to by those skilled in the art without departing from the described invention, as hereinafter defined by the appended claims, as only a preferred embodiment thereof has been disclosed.

I claim:

1. The method of fabricating a containment bag comprising the steps of securing a pair of heat sealable panels that have a pair of side edges that taper at one end into an end edge, joining together one side edge of said panels by heat sealing up to adjacent points on each of said end edges, joining an elongated narrow heat sealable panel having a flared one end edge and two side edges by heat sealing said flared one edge to said end edges of said joined panels with said flared edge of said narrow panel equal in length to said joined end edges of said pair of panels, and forming said narrow panel into a conduit with an open end conduit end by joining the above said side edges of said elongated narrow heat sealable panel through heat sealing and continuing to heat seal and join said other side edges of said pair of panels to form a bag with an opening opposite in direction from said open end at said conduit end which conduit ends can be closed off to retain fluids in said bag.

2. The method of fabricating a containment bag as set forth in claim 1 wherein the joining together of said panels along said one side edge provides a linear end edge that is less than one half of the width of said joined panels.

3. The method of fabricating a containment bag as set forth in claim 2 wherein said joining of said narrow panel to said joined panels at said end edges utilizes all of the length of said edges which are said end edges of said pair of panels and said flared one end edge on said narrow panel.

4. The method of fabricating a containment bag as set forth in claim 3 wherein the method includes the recessing of one of said pair of panels along one end opposite to said end edge to provide an apron on the remaining one of said panels.

5. The method of fabricating a containment bag as set forth in claim 4 wherein the method includes attaching of tie strings to said pair of panels to facilitate the attaching of said bag and said apron to support means for receiving and directing fluids into said bag.

* * * * *